3,032,384
PRODUCTION OF FILAMENTARY MATERIAL
Jesse L. Riley, New Providence, N.J., and Charles E. Kip, Chillicothe, Ohio, assignors to Celanese Corporation of America, New York, N.Y., a corporation of Delaware
Filed Jan. 28, 1958, Ser. No. 711,647
17 Claims. (Cl. 18—54)

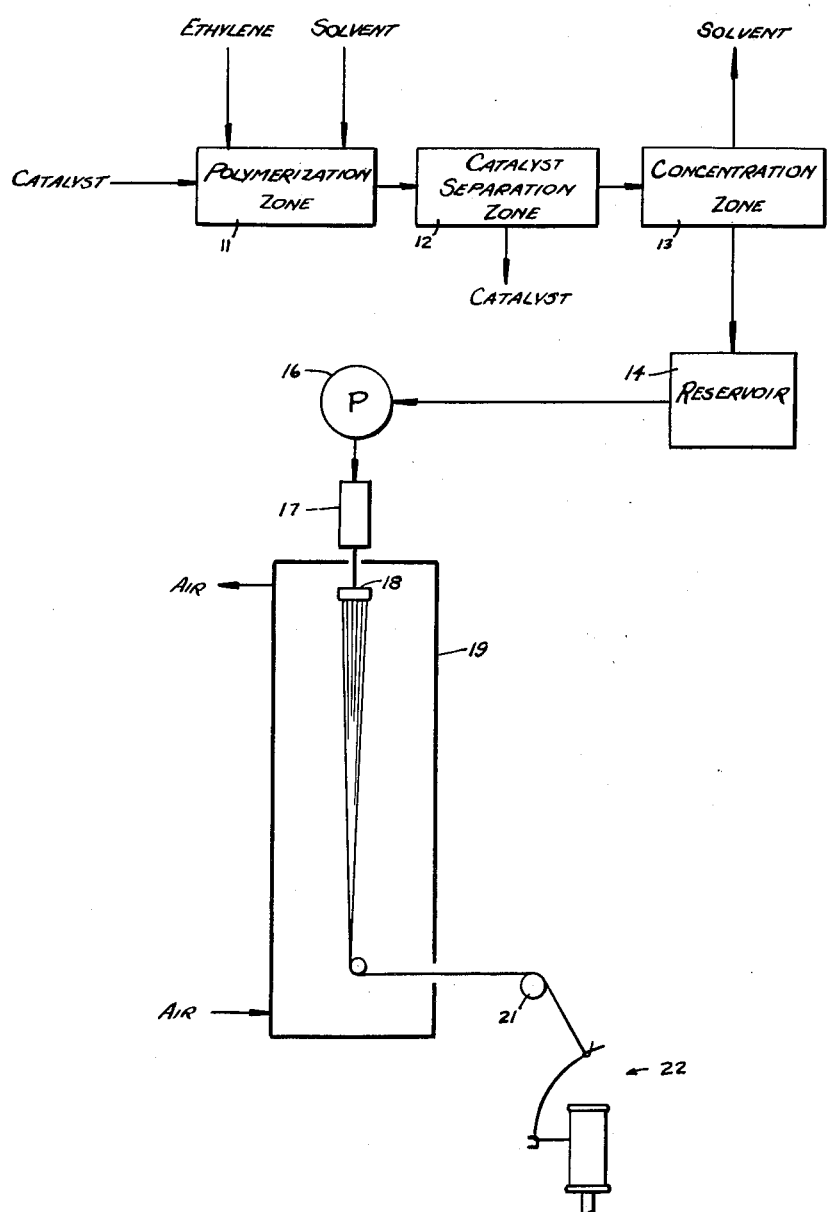

This application is a continuation-in-part of our earlier copending application Serial No. 617,024, filed October 19, 1956, and now abandoned, the entire disclosure of which is hereby incorporated by reference.

This invention relates to the production of filamentary material from polyolefine resins, particularly from polyolefine resins having melting points above 130° C.

Polyolefine resins having melting points above 130° C. differ from conventional polyolefine resins in several important respects. Their molecular structures are more ordered and they show a greater crystallinity than the lower melting point polyolefine resins. Thus in the case of polyethylene, the resins of high melting point have a high degree of crystallinity, above 90% (as determined by the method of Nielsen, Journal of Applied Physics, vol. 25, pages 1210 and 1211, October 1954) and a high density, generally above 0.955. They also have higher impact strengths and greater tensile strengths than the conventional polyethylene resins. One method for the production of such straight chain polyolefine resins is disclosed in Belgian Patent 530,617 of January 24, 1955, wherein an olefine dissolved in a low-boiling hydrocarbon solvent is brought into contact with a solid polymerization catalyst such as chromium oxide supported on silica and alumina.

Other high melting polyolefine resins include isotactic polypropylene; isotactic poly-4-methyl pentene-1; isotactic poly-3-methyl butene-1; isotactic polymer of 4,4-dimethyl pentene-1; isotactic polyvinylcyclohexane; and isotactic polystyrene.

It is an object of this invention to produce fibers of superior properties from polyolefine resins having melting points above 130° C. and particularly from straight chain polyethylene resins.

Another object of this invention is the production of fibers of polyolefine resins from solutions thereof in low-boiling solvents.

Still another object of this invention is the production of fibers from solutions obtained on polymerization of ethylene, the fibers being formed by a process in which the polymer is kept in liquid phase, without intermediate separation of the polymer from its solution prior to spinning.

Other objects of this invention will be apparent from the following detailed description and claims. In this description and claims all proportions are by weight unless otherwise indicated.

One important aspect of this invention involves the polymerization of the olefine in relatively dilute solution in a low-boiling solvent, using a solid polymerization catalyst. After the removal of catalyst particles, the solution of high melting olefine polymer thus obtained is concentrated, as by evaporation of the solvent. The resulting solution is maintained under superatmospheric pressure and at an elevated temperature, above the atmospheric boiling point of the solvent, and is forced through one or more orifices in a spinning jet at such a rate that the pressure on the high pressure side of the jet is in excess of the vapor pressure of the solution at said elevated temperature (plus the pressure of any dissolved gas) even though the pressure on the discharge side of the jet is substantially atmospheric.

The solvents employed in the practice of this invention may have boiling points below the "solution temperatures" of the polyolefine, i.e. below the temperatures at which the polyolefine forms homogeneous solutions in said solvents; these temperatures are all below the melting point of the polyolefine. Thus cyclohexane, which is the preferred solvent for straight chain polyethylene, boils at 80° C. and dissolves a straight chain polyethylene (of M.P. of about 140° C.) at a temperature of about 110° C. N-octane and its isomers are also suitable solvents. Other solvents are methyl cyclohexane, toluene, xylene, hi-flash naphtha, tetrachloroethane and mixtures of any of the solvents mentioned.

The solution being spun is relatively viscous. Thus, in the case of straight chain polyethylene of 50,000 molecular weight (as determined by intrinsic viscosity measurements) a solution of about 20 to 25% concentration has proved satisfactory. The viscosity of such solutions at the spinning temperature is in the range of about 500 to 5,000 poises (on Brookfield synchroelectric viscometer).

The step of concentrating the relatively dilute solution obtained by polymerization may be carried out conveniently by a flashing process in which the solution, under a superatmospheric pressure and at a temperature above its atmospheric boiling point (e.g. above 120° C. in the case of cyclohexane solutions) is fed into a zone of lower superatmospheric pressure (e.g. 20–50 p.s.i.g.) and a portion of the solvent evaporated, preferably while the solution is agitated. In this manner a 2 to 10% polyolefine solution obtained in the polymerization process described above may be brought easily to the desired concentration.

In one convenient spinning arrangement, the concentrated polyolefine solution is maintained, under superatmospheric pressure and at a temperature which is above the atmospheric boiling point of the solvent and which is at least as high as the "solution temperature" of the solution, in a suitable pressure vessel which acts as a reservoir. The hot solution is discharged continuously from the reservoir, under the autogenous pressure of the hot solvent, into a valved pipe or other conduit connected to the components of a conventional dry spinning apparatus (e.g. a metering pump, a suitable filter such as a candle filter, and a spinning jet), all of which are maintained at an elevated temperature sufficient to keep the resin in solution at all times (e.g. a temperature of 140 to 170° C. for straight chain polyethylene). Preferably, the temperature in the reservoir is somewhat higher than that in subsequent parts of the system, so that the pressure in said reservoir is higher, said higher pressure tending to force the solution out of the reservoir into the spinning lines. For example, the reservoir temperature may be 150 to 170° C. while the balance of the system may be at 140° C. for straight chain polyethylene.

The spinning jet may be of the conventional type carrying therein a suitable jet filter. The orifices in the spinning jet should be of such dimensions that at the desired rate of extrusion the pressure drop through the orifices is in excess of the vapor pressure of the solution at the spinning temperature so that the pressure inside the jet is maintained above said vapor pressure. Orifices whose diameters are about 30 to 60 microns and whose lengths are one to two times their diameters have been found satisfactory at spinning rates of 0.1 to 1.5 cc. of solution per orifice per minute.

The spinning jet may be situated in a spinning cabinet or spinning cell having provision for the admission of heated air or other evaporative medium and for the exhaust, into a suitable recovery system, of the evaporative medium carrying the solvent released during the spinning process. For ease of operation, the pressure in the spinning cell should be about atmospheric. The evaporative medium may be introduced so as to flow through the spinning cell in the same direction as, or countercurrent to, the filaments being formed and it may be fed in at spaced points along the path of the filaments through the spinning cell. As the filaments pass through the spinning cell the solvent in the outer surfaces of said filaments vaporizes very rapidly so that the concentration of polymer in said outer surfaces rises, while the temperature of said outer surfaces falls due to evaporation. Thus there is formed about each filament a hard sheath of polymer surrounding a superheated liquid core. The entire filament solidifies as it proceeds further through the evaporative atmosphere in the spinning cell.

High melting polyolefine resins have a strong tendency to crystallize and it is found that filaments of best properties are obtained when the conditions of spinning are such as to favor super-cooling of the solution of resin and thus to delay crystallization thereof. Thus, the solution being spun should be well-filtered and should be free of crystallite nuclei, and the rate at which solvent is lost during the process should be rapid in comparison to the rate at which the polymer starts to crystallize. For example, when straight chain polyethylene resin is used, the solution should preferably be maintained at above the melting point of the straight chain polyethylene resin prior to and during spinning so as to insure that no crystallite nuclei are formed, and the temperature of the evaporative medium into which the solution is spun should preferably be maintained at as high a level as is possible (e.g. 115–140° C.) without causing actual boiling of the solution being spun. For example, when the solvent is cyclohexane it is desirable that the air in the immediate vicinity of the spinning jet be maintained at a temperature of about 130 to 140° C. The actual temperature of the filaments being extruded is of course much less than these temperatures, due to the cooling effect resulting from evaporation of solvent.

As the filaments emerge from the spinning cell they are taken up in any suitable manner. Thus, the several filaments my be brought together to form a multifilament yarn which is wound on a bobbin or other yarn package support. Generally the linear speed at which the filaments are taken up is somewhat higher than the linear speed of extrusion so that some stretching of the filaments takes place during spinning. A suitable range of ratios of take up speed to extrusion speed is 1.01:1 to 3:1. The resulting filaments generally have relatively low tenacities and high extensibilities, e.g. tenacities of 0.4 to 0.6 gram per denier and extensibilities of 1200 to 2500% for straight chain polyethylene. By drawing the filaments, either hot or cold, filaments of very high tenacity are obtained, e.g. 7 grams per denier or higher for straight chain polyethylene. If cold-drawing is used the rate of drawing is generally lower, to avoid breakage of the filaments. The drawn filaments are very highly oriented as shown by their X-ray diffractions patterns, and their extensibility is relatively low. The extent of drawing, i.e. the draw ratio, may be varied over a wide range, depending on the properties desired, for example, the filaments may be drawn 200% to 2000%.

It has been found that freshly spun yarn may be drawn at a much more rapid rate than yarn which has been aged for some time. If desired the freshly spun yarn may be drawn without any intermediate step of winding the yarn into a package. For this purpose the yarn leaving the spinning cell may be passed directly to a first draw roll and then to a second draw roll operating at a much higher speed and thereafter wound on a bobbin or other yarn package support.

The yarn produced has a high luster, is inert to water and to most common chemicals, and is resistant to vermin. It shows excellent impact strength.

One aspect of this invention relates to starting up the spinning operation. To this end, prior to spinning, the spinning lines, including the pumps, filters and spinning jet are filled with a hot high-boiling solvent for the resin, which solvent has a boiling point in excess of the spinning temperature and, of course, in excess of the temperature at which the resin dissolves in said solvent. Suitable solvents for the purpose are, depending on the spinning temperature, for example, xylene, cumene, β-methyl naphthalene, 2-methyl thiophene, chlorobenzene, decahydronaphthalene, tetrahydronaphthalene, dicyclohexyl, 1-decene, mineral oil, and paraffin oil. The orifices in the spinning jet are blocked by any suitable obstruction, such as a resilient gasket forced against the outer surface of the jet, until the system has attained the temperature desired for the spinning operation. Thereafter the reservoir containing the spinning solution, comprising the resin in the low-boiling solvent, is connected to the spinning lines, the spinning pump is started, and the obstruction to the spinning jet is partially removed so that the high-boiling solvent is permitted to ooze out of the spinning jet. When substantially all of the high boiling solvent has been forced out of the spinning lines and the resin solution has begun to pass out of the spinning jet, the spinning pressure increases abruptly and the obstruction is then removed entirely and spinning is commenced.

In an alternative method for starting the spinning operation, the high-boiling solvent is replaced by the same low-boiling solvent as is present in the resin solution. The spinning lines are first filled with this low-boiling solvent, while cold, after which the spinning system is sealed and then heated to the desired spinning temperature, which is, of course, above the boiling point of the low-boiling solvent. The obstruction to the spinning jet is then partially removed and the solvent is forced gradually out of said jet, and spinning commenced, all in a manner similar to that described above in connection with the use of high-boiling solvent.

One suitable spinning arrangement is illustrated schematically in the accompanying drawing, in which reference number 11 designates a polymerization zone, to which solid catalyst, solvent and olefine are supplied continuously. A mixture of polymer solution and catalyst leaves the zone 11 and is fed to a catalyst-separation zone 12, from which the polymer solution passes to a concentration zone 13. The resulting concentrated polymer solution then enters a reservoir 14, from which it passes through a metering pump 16, which may be a suitable gear pump, then through a candle filter 17 and a spinning jet 18, from which it emerges in the form of a plurality of filaments into a heated spinning cabinet 19. Heated air is passed through the spinning cabinet, the air being introduced, in the embodiment shown in the drawing, at the bottom of the spinning cabinet and being withdrawn together with solvent vapors from the top of the cabinet. The filaments are brought together to form a yarn, which is drawn from the cabinet by a driven roll 21 and taken up on a ring twister indicated generally at 22.

The following examples are given to illustrate this invention further.

*Example 1*

A stream of ethylene is passed into a mixture of cyclohexane and chromium oxide catalyst, supported on silica-alumina, in the manner described in Belgian Patent 530,-617. The resulting mixture of catalyst and solution of straight chain polyethylene resin is filtered hot to remove the catalyst and the solution is passed into an agitated flasher, operated under a superatmospheric pressure of 25 pounds per square inch gauge and a temperature of 150° C. or above, where a portion of the solvent is evaporated off and the concentration of the polyethylene resin in the solution is raised, from its initial value of 5%, up to 23%. The resulting hot concentrated solution is passed into a reservoir maintained at a temperature of 170° C. and then, through a gear pump and candle filter, to a spinning jet, all of which are maintained at a temperature of 145° C. The pressure of the solution in the jet is 360 p.s.i.g. The jet has 13 orifices each 0.56 mm. in diameter and .0015″ long, and the solution is pumped through these orifices at a rate of 4.68 cc. of said solution per minute, into a spinning cabinet supplied with air at a temperature of 133° C. The resulting filaments are brought together to form a yarn, which is passed at speed of 9.5 meters per minute, over a driven rotating roll, this speed being so related to the speed of extrusion that the drawdown of the filaments in the cabinet is about 5%. The yarn is then wound and given a twist of 0.2 turn per inch on a ring twister. The yarn thus obtained has a total denier of 85, 7.3 denier per fil, a tenacity of 0.5 gram per denier, and an elongation at break of 1500% determined at a strain rate of 50% per minute. The freshly spun yarn is then drawn 770% over a hot metal shoe at a temperature of 95° C. The drawn yarn has a denier of 0.95 per fil, a tenacity of 7.3 grams per denier, and an elongation at break of 10.4%.

*Example 2*

23 parts of isotactic poly-4-methyl pentene-1, having a melting point of 230° C. and an intrinsic viscosity of 2.5 measured in tetrahydronaphthalene at 130° C., and prepared in known manner by polymerization of 4-methyl pentene-1 in the presence of aluminum triisobutyl and titanium tetrachloride, is dissolved in 100 parts of xylene by tumbling a mixture of the polymer and xylene for 20 hours at a temperature of 170° C. The solution, in a closed container under nitrogen at superatmospheric pressure, is extruded, through a spinnerette having 1 hole 0.096 mm. in diameter, vertically upward into the surrounding atmosphere, where the xylene evaporates, to form a filament which is taken up on a driven pulley. The following results were obtained under the conditions indicated below:

| Filament | Extrusion pressure, p.s.i.g. | Temperature of Solution and Spinnerette, ° C. | Take up speed, m./min. | Denier of Filament | Modulus of filament, g./d. | Tenacity of filament, g./d. | Elongation of filament at break, g./d. |
|---|---|---|---|---|---|---|---|
| (a) | 100 | 175 | 8.5 | 12 | 17 | 0.82 | 38 |
| (b) | 50 | 180 | 5.0 | 16 | 15 | 0.46 | 130 |
| (c) | 100 | 193 | 8.0 | 25 | 13 | 0.40 | 151 |
| (d) | 60 | 195 | 13.0 | 10 | 17 | 0.54 | 115 |
| (e) | 100 | 185 | 15.0 | 11 | 16 | 0.51 | 95 |

The above filaments were then drawn by stretching them between two sets of rollers running at different speeds, the filaments passing over a heated shoe located between the two sets of rolls. The following results were obtained at the temperature indicated below, the extent of drawing being varied to give the filament deniers set forth below:

| Filament | Shoe Temperature, ° C. | Denier of Drawn Filament | Modulus, g./d. | Tenacity, g./d. | Elongation at break, percent |
|---|---|---|---|---|---|
| (a) | 150 | 3.9 | 26 | 2.2 | 22 |
| (b) | 135 | 3.5 | 25 | 2.4 | 25 |
| (c) | 150 | 5.1 | 24 | 2.5 | 25 |
| (c) | 155 | 4.6 | 27 | 2.6 | 24 |
| (d) | 155 | 3.5 | 29 | 2.7 | 23 |
| (e) | 125 | 3.7 | 26 | 1.8 | 24 |

*Example 3*

An 18% solution in xylene of isotactic polypropylene (having a melting point of 160–165° C. and an intrinsic viscosity of 7.0, as measured in tetrahydronaphthalene at 130° C.) said solution containing 0.1%, based on the polymer, of the stabilizer, 2,6-di-t-butyl p-cresol, was extruded at a temperature of 177° C. and under a pressure of 260 p.s.i.g. through a spinnerette having 5 holes each 0.154 mm. in diameter, downwardly into air at atmospheric pressure in a spinning cabinet 3 feet high, the air temperature being 140° C. at the top of the cabinet and 128° C. at the bottom, the resulting 5-filament 190 denier yarn being taken up at the rate of 48 meters per minute.

The term "melting point" as used herein refers to the temperature at which a powdered sample of the resin, placed on a melting point block, begins to lose its property of birefringence; at the same time the sample begins to become clear and lose its crystallinity. This temperature is generally below that at which a fluid melt is obtained.

It is understood that the foregoing detailed description is given merely by way of illustration and that many variations may be made therein without departing from the spirit of our invention.

Having described our invention what we desire to secure by Letters Patent is:

1. Process for the production of filamentary materials which comprises extruding through a spinning orifice a solution of a highly crystalline polyolefine resin having a melting point above 130° C., in a volatile solvent having an atmospheric boiling point below the melting point of said polyolefine resin and evaporating said volatile solvent from said extruded solution without the boiling thereof, said solution which is extruded being maintained at a temperature above the atmospheric boiling point of said solvent.

2. Process for the production of filamentary materials which comprises extruding through a spinning orifice a solution in a volatile solvent of a highly crystalline polyolefine resin having a melting point above 130° C. and evaporating said volatile solvent from said extruded solution without the boiling thereof, the solution being extruded being maintained at a temperature above the solution temperature of said polymer in said solvent and above the atmospheric boiling point of the solvent.

3. Process as set forth in claim 2 in which the rate of extrusion is such that the pressure drop through the spinning orifice is in excess of the vapor pressure of the solution at the spinning temperature.

4. Process as set forth in claim 2 in which the resin is a straight chain polymer of ethylene and the solution being extruded is maintained at a temperature of at least the melting point of said straight chain polyethylene.

5. Process as set forth in claim 2 in which the resin is a straight chain polymer of ethylene and the solvent is cyclohexane and the solution being extruded is maintained at a temperature of about 140 to 170° C.

6. Process as set forth in claim 5 in which said extrusion temperature is at least as high as the melting point of said straight chain polyethylene.

7. Process for the production of filamentary materials which comprises polymerizing an olefin in a volatile solvent in the presence of a highly crystalline polymerization catalyst to form a solution of a polyolefin resin having a melting point above 130° C. and above the solution temperature of said polyolefine resin in said solvent, concentrating said solution by removing a portion of said solvent, extruding said solution through a spinning orifice of a spinning jet while maintaining said solution at a temperature above said solution temperature and above the atmospheric boiling point of said solvent, said solvent having an atmospheric boiling point below the melting point of said polyolefine resin and evaporating said volatile solvent from said extruded solution without the boiling thereof.

8. Process as set forth in claim 7 wherein said solution is concentrated by flashing at superatmospheric pressure until it has a viscosity of about 500 to 5,000 poises measured at said temperature of extrusion.

9. Process as set forth in claim 7 wherein said polyolefine is a straight chain polymer of ethylene and said solution is extruded at a temperature of at least the melting point of said polyolefine.

10. Process as set forth in claim 1 in which spinning is started by filling said spinning jet with a liquid consisting essentially of a solvent for said resin, extruding said solvent through said jet at said extrusion temperature and feeding said solution of resin to said spinning jet under pressure to displace said solvent therefrom.

11. Process as set forth in claim 2 in which said solution is extruded into air at atmospheric pressure and at a temperature of 115–140° C.

12. Process as set forth in claim 2 in which said polyolefine is an isotactic polymer of propylene.

13. Process as set forth in claim 2 in which said polyolefine is an isotactic polymer of 4-methyl pentene-1.

14. Process as set forth in claim 2 in which said polyolefine is an isotactic polymer of 3-methyl butene-1.

15. Process as set forth in claim 2 in which said polyolefine is an isotactic polymer of 4,4-dimethyl pentene-1.

16. Process as set forth in claim 2 in which said polyolefine is an isotactic polymer of vinyl cyclohexane.

17. Process as set forth in claim 2 in which said polyolefine is an isotactic polymer of styrene.

References Cited in the file of this patent

UNITED STATES PATENTS

| | | |
|---|---|---|
| 2,210,771 | Myles et al. | Aug. 6, 1940 |
| 2,330,932 | Taylor et al. | Oct. 5, 1943 |
| 2,648,647 | Stanton et al. | Aug. 11, 1953 |
| 2,716,049 | Latour | Aug. 23, 1955 |
| 2,762,791 | Pease et al. | Sept. 11, 1956 |
| 2,816,883 | Larcher et al. | Dec. 17, 1957 |
| 2,825,721 | Hogan et al. | Mar. 4, 1958 |
| 2,858,290 | Davis et al. | Oct. 28, 1958 |
| 2,867,495 | Myers | Jan. 6, 1959 |

FOREIGN PATENTS

| | | |
|---|---|---|
| 131,333 | Australia | Feb. 11, 1949 |